United States Patent
Ehrman (10) Patent No.: US 8,972,473 B2
(45) Date of Patent: *Mar. 3, 2015

(54) EFFICIENT AND RELIABLE COMPUTATION OF RESULTS FOR MATHEMATICAL FUNCTIONS

(75) Inventor: John Robert Ehrman, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 350 days.

This patent is subject to a terminal disclaimer.

(21) Appl. No.: 13/479,040

(22) Filed: May 23, 2012

(65) Prior Publication Data

US 2012/0239720 A1 Sep. 20, 2012

Related U.S. Application Data (63) Continuation of application No. 12/246,203, filed on Oct. 6, 2008, now abandoned, which is a continuation of application No. 10/862,559, filed on Jun. 7, 2004, now Pat. No. 7,454,455.

(51) Int. Cl.
G06F 7/499 (2006.01)
G06F 17/17 (2006.01)

(52) U.S. Cl.
CPC ............ *G06F 17/17* (2013.01); *G06F 7/49905* (2013.01)
USPC .......................................................... 708/553

(58) Field of Classification Search
None
See application file for complete search history.

(56) References Cited

U.S. PATENT DOCUMENTS

| | | | |
|---|---|---|---|
| 5,260,890 A | 11/1993 | Suzuki | |
| 5,907,498 A | 5/1999 | Rim | |
| 6,304,889 B1 | 10/2001 | Ehrman | |
| 6,457,036 B1 | 9/2002 | Sloan | |
| 7,149,766 B1 | 12/2006 | Bruso et al. | |
| 7,206,800 B1 | 4/2007 | Bentz | |
| 7,454,455 B2 * | 11/2008 | Ehrman | 708/553 |
| 2004/0167954 A1 | 8/2004 | Griessing | |
| 2009/0043835 A1 * | 2/2009 | Ehrman | 708/553 |

OTHER PUBLICATIONS

"Programming", http://www.evergreen.edu/biophysics/technotes/program/2s_comp.htm, 4 pages, May 24, 2004.
"What Every Computer Scientist Should Know about Floating-point Arithimetic", Jun. 1992, Part No. 800-7895-10.
"Functions of Several Variables", http://www.ltcconline.net/greenl/courses/117/DerivNvar/fbSevVar.htm, pp. iii, iv, 1, 32, and 33, May 25, 2004.

* cited by examiner

*Primary Examiner* — David H Malzahn
(74) *Attorney, Agent, or Firm* — Kunzler Law Group (57) ABSTRACT

For efficient computation of results for mathematical functions, a method receives a mathematical function call. The call includes a plurality of arguments for which a range of computable results for the mathematical function of the function call varies with respect to the values for the arguments. The method determines whether executing the mathematical function using the plurality of arguments will produce a result within the range of computable results. The method further aborts the mathematical function call prior to initiating execution of the mathematical function in response to determining that the values for the plurality of arguments produce a result outside the range of computable results.

18 Claims, 9 Drawing Sheets

| Index | Exponent Y | Largest X | Smallest X |
|---|---|---|---|
| 1 | 1.25 | 4.8713e+60 | 2.4309e-63 |
| 2 | 1.50 | 3.7414e+50 | 6.6293e-53 |
| 3 | 1.75 | 2.2301e+43 | 1.8860e-45 |
| 4 | 2.00 | 8.5071e+37 | 7.3468e-40 |
| 5 | 2.25 | 5.1923e+33 | 1.6380e-35 |
| 6 | 2.50 | 2.2071e+30 | 4.9304e-32 |
| 7 | 2.75 | 3.8485e+27 | 3.4593e-29 |
| 8 | 3.00 | 1.9343e+25 | 8.1420e-27 |
| 9 | 3.25 | 2.1948e+23 | 8.2718e-25 |
| 10 | 3.50 | 4.7224e+21 | 4.3428e-23 |
| 11 | 3.75 | 1.6952e+20 | 1.3446e-21 |
| 12 | 4.00 | 9.2234e+18 | 2.7105e-20 |
| .... | .... | .... | .... |
| 44 | 12.00 | 2.0972e+06 | 3.0039e-07 |
| 45 | 12.25 | 1.5582e+06 | 4.0812e-07 |
| 46 | 12.50 | 1.1716e+06 | 5.4774e-07 |
| 47 | 12.75 | 8.9078e+05 | 7.2669e-07 |
| 48 | 13.00 | 6.8446e+05 | 9.5367e-07 |
| .... | .... | ......... | ........ |
| 240 | 61.00 | 1.7532e+01 | 5.2110e-02 |
| .... | .... | ......... | ........ |

EFFICIENT AND RELIABLE COMPUTATION OF RESULTS FOR MATHEMATICAL FUNCTIONS

CROSS-REFERENCES TO RELATED APPLICATIONS

This application is a continuation of and claims priority to U.S. patent application Ser. No. 12/246,203 entitled "Method for Efficient and Reliable Computation of Results for Mathematical Functions" and filed on Oct. 6, 2008 for John Robert Ehrman and which is incorporated herein by reference is a continuation of and claims priority to U.S. patent application Ser. No. 10/862,559 entitled "Apparatus and System for Efficient and Reliable Computation of Results for Mathematical Functions" and filed on Jun. 7, 2004 for John Robert Ehrman, which is incorporated herein by reference.

BACKGROUND OF THE INVENTION

1. Field of the Invention

The invention relates to software for implementing mathematical functions. Specifically, the invention relates to methods for efficient and reliable computation of results for mathematical functions.

2. Description of the Related Art

Generally, processing systems such as computers and calculators are capable of evaluating a set of general purpose mathematical functions, also referred to herein as math functions. Certain math functions are executed hundreds or thousands of times to perform what appear to a user to be simple operations, such as simple animation. The software libraries that implement the math functions are consequently written for very fast execution using a highly optimized form of assembly language or machine code. Generally, these math functions perform well for a large set of values that can be provided as arguments to the math function.

Math functions are considered to provide results within number sets bounded by negative infinity and positive infinity. Conventional computers, however, have natural limits on the maximum value, minimum value, and type of value that can be represented in the computer. Typically, these limits depend on the hardware and software architecture of the processing system that evaluates the math function. Values that fall outside of these limits are referred to herein as unrepresentable values or incomputable results. Similarly, values that fall within these limits are referred to as computable results or representable values. Incomputable results are those for which a valid mathematical result exists, but the result can not be represented due to natural limits of the processing system.

To account for natural limits on results for math functions, conventional systems often check an argument for invalid values. Such invalid values can be of several types, including those for which the result for the math function is undefined (such as division by zero). Certain math functions check in advance for incomputable results. For example, on a computer using the IBM hexadecimal floating point data representation, a routine that evaluates the exponential function exp(X) for a floating point argument X can check that the value of X does not exceed 174.673. If so, an error condition is signaled for an unrepresentable, invalid result. Other functions of a single argument such as exp(x), sin h(x), cos h(x), tan(x), arcsin(x), gamma(x), and the like typically check the argument value against one or two limit values (such as upper and lower bounds) to identify unrepresentable values.

Conventional math functions, however, typically fail to perform such checking for a computable result when the function involves a plurality of arguments. Conventionally, the overhead in determining whether the argument values will provide a computable result causes an unacceptable delay. Consequently, conventional math functions favor speed over reliability in evaluating functions that accept a plurality of arguments. The math functions presume that for the argument values provided the math function will return a representable result. Accordingly, the math function is evaluated using the argument values. The math function evaluation can consume considerable memory and processing resources. If the result of the math functions turns out to be unrepresentable, these resources are wasted.

Consequently, such function argument values are permitted to evaluate until the processing system detects that the result being computed is unrepresentable or noncomputable. Generally, a noncomputable result or an unrepresentable result is one that is a mathematically undefined result for the function, larger than the processing system is designed to represent, smaller than the processing system is designed to represent, or includes an imaginary portion such as with complex numbers when a real (non-complex) result is required.

Figure 1:
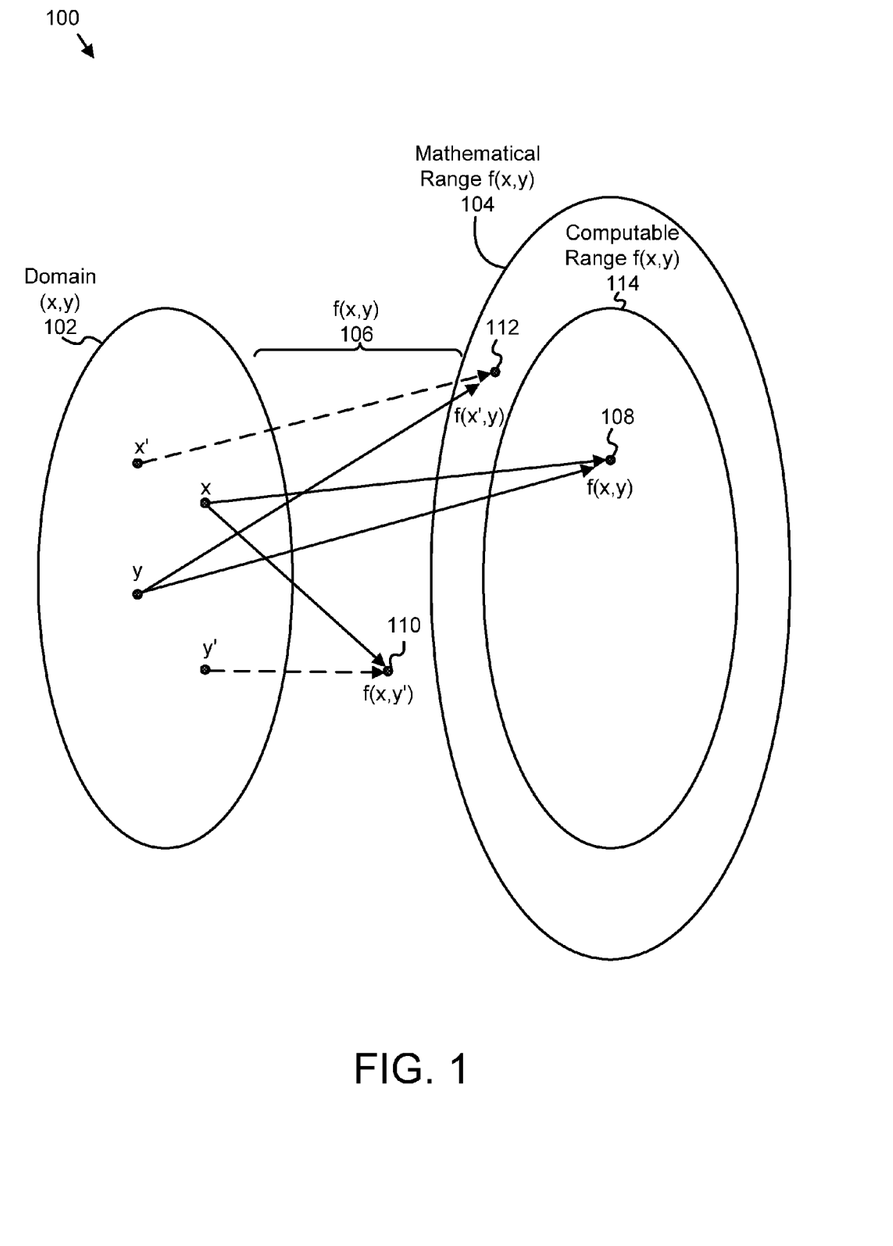
FIG. 1 is a graph diagram illustrating logically how functions may map argument values in a domain to a mathematical or computable range.

FIG. 1 illustrates a conceptual representation 100 of a function f(x,y) that accepts a plurality of arguments (x,y) and maps values in a domain (x,y) 102 to a mathematical range f(x,y) 104 defined for the function f(x,y). The domain 102 and range 104 each comprises a number set of the same or different type. For example, the domain 102 may include whole numbers and the range 104 may include real numbers such as a decimal or other non-integer number.

The function f(x,y) 106 maps, or translates, a given x and a given y from the domain 102 to a proper result in the range 104. For example, suppose the domain 102 comprises whole numbers (integers as represented in the computer) and the function 106 is the mathematical power function $f(x,y)=x^y$. For most x and y values chosen in the domain 102, the function returns a valid computable result 108. If x=2 and y=3, f(x,y) returns the result 8. For certain values of x and y, the mathematical function may be undefined. So, if x=0 and y=0, the function 106, $x^y$, maps to a mathematically undefined result 110.

Other combinations of arguments x and y produce a result 112 that is either too large, or too small for the processing system evaluating the function 106 to represented. If the result or an intermediate result is too large, the condition is referred to as overflow. If the result or an intermediate result is too small, the condition is referred to as underflow.

Because the result is unrepresentable, the result is considered incomputable for the particular processing system. For example, suppose the processing system represents numbers as integers in a memory location having thirty-one data bits and one sign bit. Using the same function 106, $x^y$, if x=2 and y=31 the result 112 is larger than the largest positive integer that can be stored in a result memory location of the processing system.

FIG. 1 illustrates that this result 112 is mathematically valid, is within the mathematical range 104, but in this case is too large for the computer to represent using its standard hardware and architecture. Such a result 112 is considered outside the computable range 114 for the function 106. The computable range 114 represents a range of all computable results for a given function 106.

Results 112 outside of the computable range 114, including mathematically undefined results 110, are considered error conditions. Generally, the math function will signal this error condition. However, the math function typically does not identify the error condition until large amounts of time, memory, and processing power are expended.

Unfortunately, conventional math functions do not determine whether the given arguments will produce a computable result 108. One reason for this is the variation between arguments that can dramatically alter whether the result is within the computable range 114. For example, a given x and y value may produce a computable result 108. But changing one argument or the other can produce an incomputable result 110, 112. Keeping the same x value and using y' produces an undefined result 110. Keeping the same y and using x' produces incomputable result 112 due to overflow or underflow.

The interrelationships between the arguments and the function 106 and the affect of these relationships on the result falling within the range of computable results 114 make detecting such error conditions for values of a plurality of arguments very difficult. The range of computable results 114 varies depending on which values are provided for the arguments. Furthermore, the range of computable results 114 is shifted based on the value of a first argument in relation to the value of a second argument. Conventional math functions avoid such testing of arguments for a particular function because the overhead (which introduces a delay in function execution) in conducting such tests is expected to outweigh the benefit of preventing wasted computing resources.

From the foregoing discussion, it should be apparent that a need exists for a method for efficient and reliable computation of results for mathematical functions. Beneficially, such method would operate accurately and very quickly in testing a plurality of math function arguments to determine whether present argument values produce a result within the range of computable results. Beneficially, the method would incur minimal overhead in testing the arguments. In addition, the method would prevent wasting computing resources evaluating a function for which the plurality of arguments would produce an incomputable result.

SUMMARY OF THE INVENTION

A method is disclosed for efficient computation of results for mathematical functions. The method receives a mathematical function call. The call includes a plurality of arguments for which a range of computable results for the mathematical function of the function call varies with respect to the values for the arguments. The method determines whether executing the mathematical function using the plurality of arguments will produce a result within the range of computable results. The method further aborts the mathematical function call prior to initiating execution of the mathematical function in response to determining that the values for the plurality of arguments produce a result outside the range of computable results.

BRIEF DESCRIPTION OF THE DRAWINGS

In order that the advantages of the different embodiments of the invention will be readily understood, a more particular description of the embodiments briefly described above will be rendered by reference to specific embodiments that are illustrated in the appended drawings. Understanding that these drawings depict only typical embodiments of the invention and are not therefore to be considered to be limiting of its scope, the embodiments will be described and explained with additional specificity and detail through the use of the accompanying drawings, in which.

DETAILED DESCRIPTION OF THE INVENTION

It will be readily understood that the components of embodiments of the present invention, as generally described and illustrated in the Figures herein, may be arranged and designed in a wide variety of different configurations. Thus, the following more detailed description of the embodiments of the method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the embodiments of the invention can be practiced without one or more of the specific details, or with other methods, components, materials, etc. In other instances, well-known structures, materials, or operations are not shown or described in detail to avoid obscuring aspects of the various embodiments.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
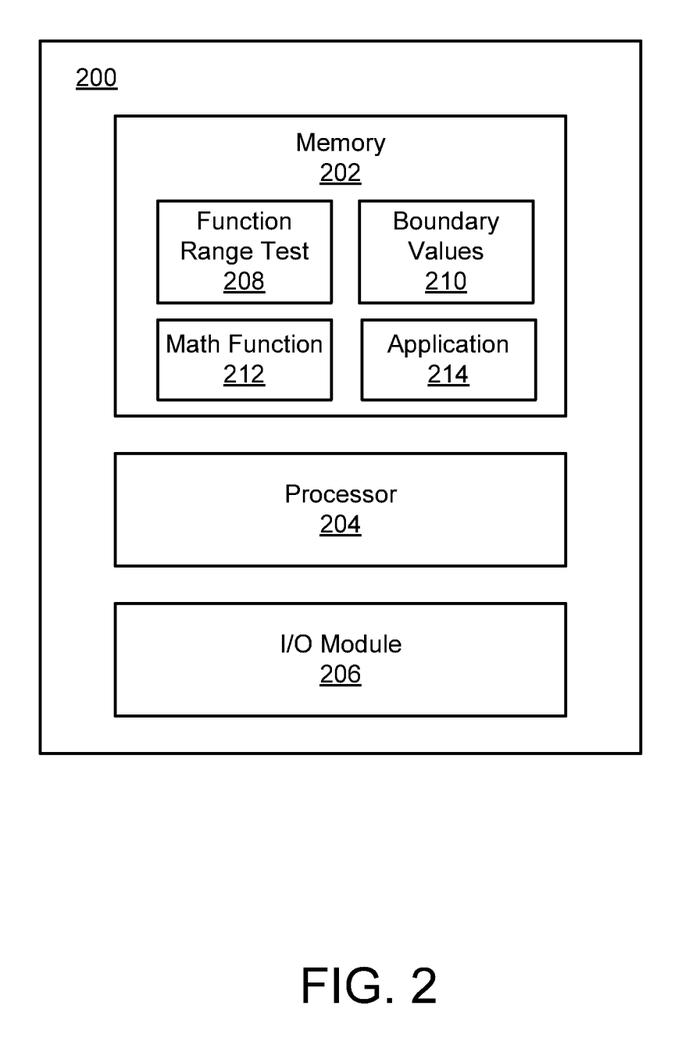
FIG. 2 is a schematic block diagram illustrating one embodiment of a system for efficient and reliable computation of results for mathematical functions.

FIG. 2 illustrates a logical block diagram of a system 200 suitable for efficient and reliable computation of results for mathematical functions. The system 200 may include a memory 202, a processor 204, and an Input/Output (I/O) module 206. Those of skill in the art will recognize that the memory 202, processor 204, and Input/Output (I/O) module 206 are operably connected using hardware such as a communication bus. Alternatively, the memory 202, a processor 204, and Input/Output (I/O) module 206 may be distributed among a number of processing systems and communicate using a network interconnect.

The memory 202 may comprise a non-volatile memory such as a hard disk drive, Compact Disk Read Only Memory CDROM drive, a read-only memory device, or a random access volatile memory (RAM). Alternatively, the memory 202 may comprise a combination of ROM and RAM. For example, certain data may be stored in ROM that serves as a cache. In certain embodiments, the memory 202 is on a chip that implements the processor 204.

The processor 204 comprises any processor suitable for evaluating math functions. The processor 204 may comprise a general purpose processor such as a Central Processing Unit (CPU) of a computer or a special purpose processor of an Application Specific Integrated Circuit (ASIC).

The I/O module 206 may receive inputs from a user or another device. Similarly, the I/O module 206 may send output to one or more output devices such as a monitor or a printer. In one embodiment, the I/O module communicates results of math functions to a user and/or error messages associated with error conditions for the math functions.

Preferably, the system 200 includes a function range test module 208 and a set of boundary values 210. Preferably, the processor 204 executes the function range test module 208 prior to evaluating object code to perform a math function 212.

In one embodiment, the processor 204 transmits substantially all math function calls to the function range test module 208. If the function range test module 208 is configured to test arguments for the particular function call, the function range test module 208 returns a value to the processor 204 indicating whether proceeding with evaluation of the function call will produce a computable result. If the function range test module 208 is not configured to test the particular function, control is returned to the processor 204 which then evaluates the function 212 with the given arguments.

Alternatively, the function range test module 208 is integrated into one or more select math functions 212. For example, math functions 212 that use a plurality of arguments or complex numbers for one or more arguments may include the function range test module 208. Examples of math functions 212 that may utilize the function range test module 208 include a power function (x^y), a Bessel function, a Jacobi function. In addition, functions for computing well-known constants may also use the function range test module 208. For example, a function to compute C, C(n,m), which computes the number of combinations of n items taken m at a time. In addition, a function to compute the "Stirling Numbers," S(n,x) may also use the function range test module 208.

The function range test module 208 determines whether the values for function calls that include a plurality of arguments or at least one complex number argument will produce a result within the range of computable results for the particular function 212. The function range test module 208 references the set of boundary values 210 in order to make a rapid determination based on the particular function call and the specific values provided for the function arguments.

The set of boundary values 210 may include one or more subsets of boundary values specific to a particular function. Alternatively, the memory 202 comprises a different set of boundary values 210 for each function 212 supported by one embodiment. The sets of boundary values 210 are preferably structured such that for a given value or index one or more corresponding boundary values can be referenced.

In one example, the system 200 is initiated when a software program issues a mathematical function call. In one embodiment, the processor 204 or a math co-processor for the processor directs the function call and the argument values for the call to the function range test module 208. The function range test module 208 determines whether the function argument values will produce a result within the range of computable results for the particular function. Details of this determination are explained below.

If the result is computable, the processor 204 then evaluates the math function 212. If not, the processor 204 communicates the error condition to the application 214 or directly to a user using the I/O module 206. In this manner, the system 200 prevents wasted computing resources attempting to compute a result which is incomputable. Furthermore, the function range test module 208 performs the test so quickly that overhead in performing test is minimal. Consequently, the benefit in performing the test provides fast reliable results that outweighs the risk of wasting computing resources or continuing computations with an erroneous result.

Figure 3:
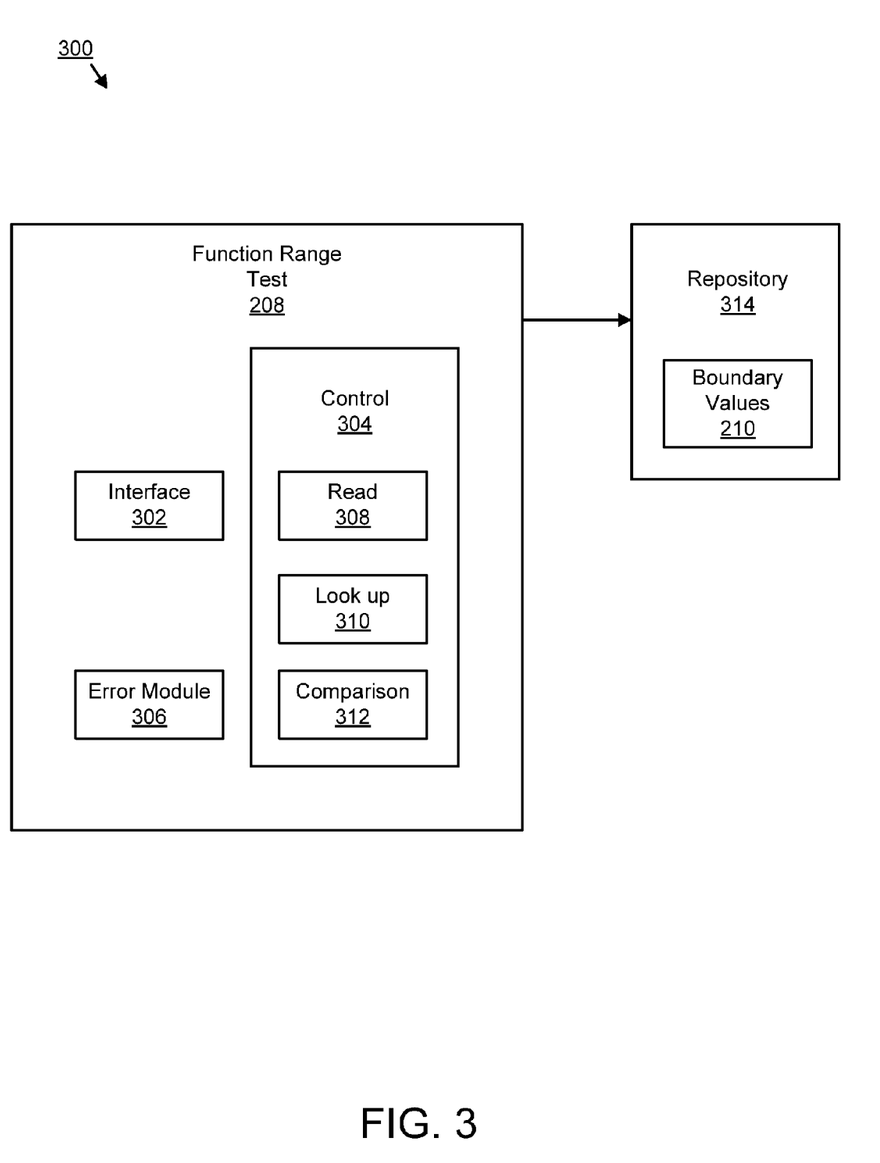
FIG. 3 is a schematic block diagram illustrating one embodiment of an apparatus for efficient and reliable computation of results for mathematical functions.

FIG. 3 illustrates an apparatus 300 according to one embodiment for efficient and reliable computation of results for mathematical functions. In one embodiment, the apparatus 300 comprises software modules that implement the function range test 208 of FIG. 2. Of course, the apparatus 300 may be implemented as hardware or software.

The apparatus 300 includes an interface 302, a control module 304 and an error module 306. The interface 302, control module 304, and error module 306 cooperate to determine whether the function arguments will produce a computable result 108 (See FIG. 1). The interface 302, control module 304, and error module 306 preferably communicate using conventional software techniques such as function calls, pointers, and the like.

The interface module 302 receives a mathematical function call. In one embodiment, the interface module 302 comprises an Application Programming Interface (API) that facilitates use of the services provided by the function range test module 208 to various software modules. The function call identifies the function that is to be evaluated as well as the argument values for the function. Preferably, the function call is one that includes a plurality of arguments for which the range of computable results 114 (See FIG. 1) varies with respect to the values of the arguments. This means that given a first argument value, the result produced for a given second argument value may or may not fall within the range of computable results 114.

Of course function calls involving more than two arguments may also be evaluated in the same manner as described below. Furthermore, function calls having a single argument that comprises a complex number, z, such that z=x+iy (where i=square root of −1), can also be used with the function range test module 208. Examples of such functions include trigonometric functions of a complex variable including sin(z), cos(z), tan(z), sin h(z), cos h(z), tan h(z), and others.

The interface module 302 communicates an identifier of the function and the argument values to the control module 304. The control module 304 determines whether evaluation or execution of the math function using the provided argument values will produce a result within the range of computable results 114. Preferably, the control module 304 makes this determination by examining each of the argument values provided and determining whether each argument value is within certain limits, referred to herein as boundaries. The boundaries for each argument value change based on the other argument values.

Computing these boundaries may incur a prohibitive delay. Consequently, predefined boundaries may be included that are referenced by the control module 304 to make the determination. If all the argument values fall within the boundaries, the result is within the range of computable results.

The boundaries are marked by one or more boundary values 210. Typically, each set of boundary values 210 is directly related to a particular function. While the variability of a second argument affects the range of computable results 114, a boundary value for the second value is known and predefined. If the second value crosses the boundary value (is greater than or less than the boundary value, as appropriate) the result is known to be outside the range of computable results 114.

To facilitate examination of boundary values in relation to argument values, the control module 304 may include a reader module 308, a lookup module 310 and a comparison module 312. The reader module 308 reads a first value associated with a first argument of the mathematical function and a second value associated with a second argument. One of the arguments is used as an identifier for referencing the boundary values 210. In other words, the argument is a key or index into a data structure that stores the boundary values.

The lookup module 310 uses the value for the key or index argument, the first value, to retrieve a boundary value from a repository 314 of predefined boundary values 210. The repository 314 may comprise substantially any data structure capable of returning one or more boundary values 210 in response to a specific index or key value. For example, the repository 314 may comprise a list of key-value pairs. Alternatively, the repository 314 may comprise a hash table or other similar data structure.

In one embodiment, the repository 314 comprises a table of data in a row-column format. The table may be referred to as a lookup table because the table is typically predefined and used just for reference and not for changing and storing disparate data. Each row in the table may include one or more boundary values specific to a particular argument value. The first value read by the reader module 308 may serve as an index in locating a row in the table.

Preferably, the set of boundary values 210 includes at least one boundary value for each first value within a domain of the first argument. In building the predefined set of boundary values 210, certain values for the first argument will reach a natural limit, an upper boundary and a lower boundary, for which a higher or lower value of the first argument will produce an incomputable result for the function. The values for the first argument between the lower boundary and the upper boundary comprise the domain of the first argument. Consequently, boundaries for the first argument may be checked by the presence or absence of a boundary value for a given first value.

Alternatively, the domain of the first argument may comprise an infinite number of possible values. Consequently, the set of boundary values 210 may comprise a reasonable subset of the domain of the first argument. In this manner, the size of the set of boundary values 210 is kept within design parameters for the repository 314. In one embodiment, first values that do not include a corresponding boundary value in the set of boundary values 210 may automatically cause the function range test module 208 to permit evaluation of the function. In another embodiment, these first values may automatically cause the function range test module 208 to signal an error condition. The behavior implemented depends largely on the makeup and design of the set of boundary values 210.

The lookup module 310 provides the one or more retrieved boundary values to the comparison module 312. The comparison module compares the second value to the one or more retrieved boundary values. Depending on the type of boundary value(s), the comparison module 312 determines whether the second value satisfies the boundary values.

Typically, boundary values are of two types, a maximum boundary value and a minimum boundary value. If the boundary value is a maximum boundary value, second values greater than the maximum boundary value fail to satisfy the boundary value. If the boundary value is a minimum boundary value, second values less than the minimum boundary value fail to satisfy the boundary value. If both a maximum boundary value and a minimum boundary value are provided, the second value should be between the maximum boundary value and the minimum boundary value to satisfy the boundary value test.

If the second value satisfies the boundary value, the comparison module 312 signals that based on the first value and second value the function will provide a result 108 (See FIG. 1) within the range of computable results 114. If not, the comparison module 312 signals an error condition. If the comparison module 312 determines that the function will provide a computable result 108 and more than two arguments exist, the reader 308, lookup module 310, and comparison module 312 cooperate to compare each additional argument value to corresponding boundary values in the set of boundary values 210. Preferably, the same first value is used as the index to retrieve the proper boundary values from the set of boundary values 210. In certain embodiments, this process is repeated until all argument values have been compared with a corresponding boundary value in the repository 314. In one embodiment, a subsequent set of boundary values for a next argument may depend on the value of the second argument being properly validated.

If an error condition is signaled, the comparison module 312 communicates with the error module 306. Typically, an error condition comprises any combination of argument values for the function that will produce a result 110, 112 (See FIG. 1) outside the range of computable results 114. As mentioned above, error conditions may include overflow errors, underflow errors, and mathematically undefined results for the given set of argument values. The error module 306 aborts the mathematical function call prior to a processor 204 (See FIG. 2) initiating execution of the mathematical function 212. In one embodiment, based on a return value from the function range test module 208 signaling an error condition, the processor 204 may then not evaluate the math function 212. Instead, the processor 204 may facilitate communication between the error module 306 and the I/O module 206 such that an error message is presented. Alternatively, a return code signaling an error condition may be returned to the function or object code that initiated the function call.

Advantageously, the apparatus 300 provides a fast, efficient, function range test module 208 for determining whether a given function call having a plurality of arguments will produce a computable result 108. The predefined boundary values in the repository 314 provide quick access for high speed comparisons to rapidly determine whether execution of the function call should continue and will produce a computable result. In addition, the comparison quickly determines whether executing the function with the given argument values would waste computing resources because of the incomputable results 110, 112.

Figure 4:
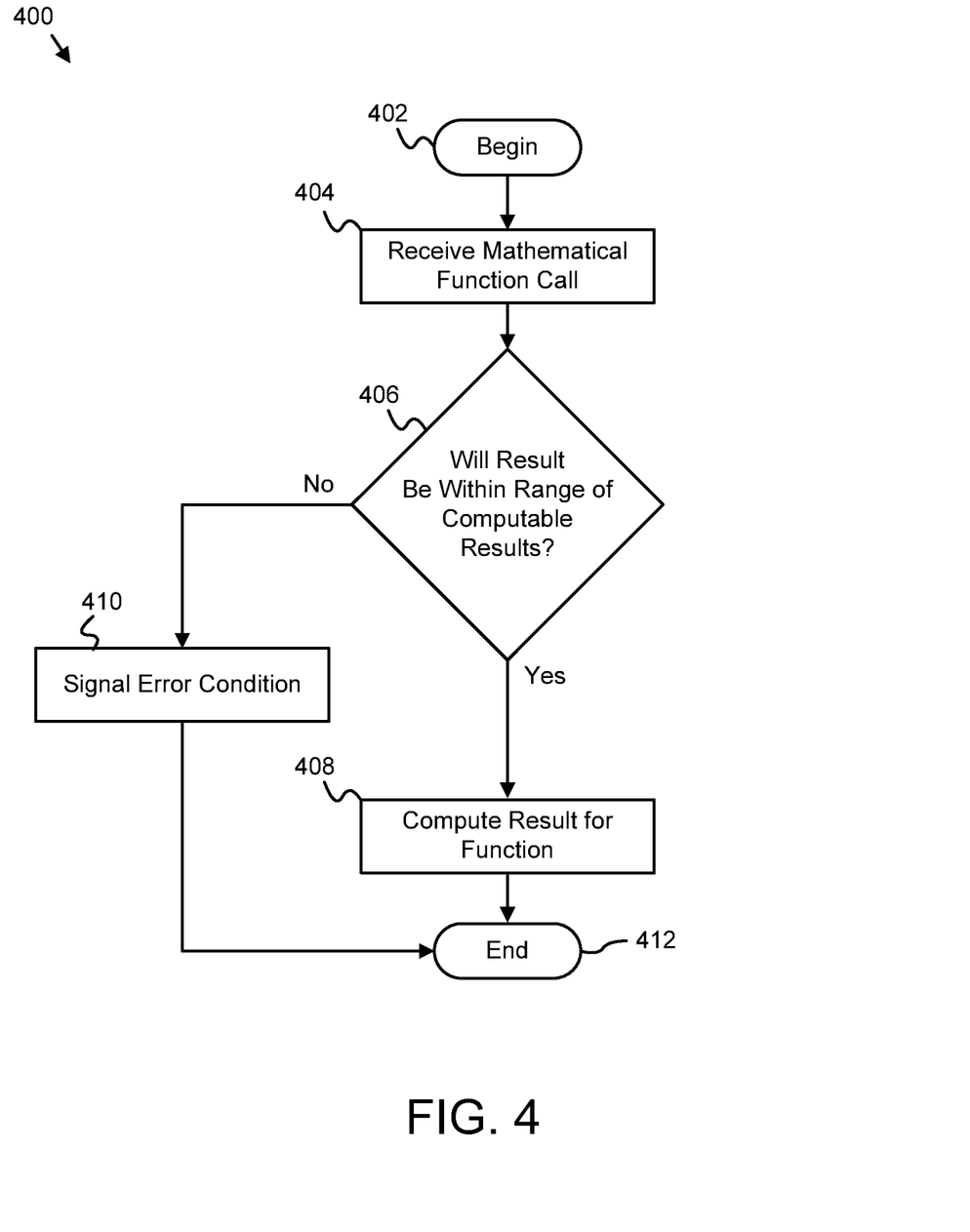
FIG. 4 is a schematic flow chart diagram illustrating one embodiment of a method for efficient and reliable computation of results for mathematical functions.

FIG. 4 illustrates a schematic flow chart diagram illustrating one embodiment of a method 400 for efficient and reliable computation of results for mathematical functions. The method 400 begins 402 once a function call is issued for a math function that includes either a complex number argument or a plurality of arguments. First, the interface module 302 (See FIG. 3) receives 404 the mathematical function call. Next, the control module 304 determines 406 whether a result computed for the function call with the given argument values will be within the range of computable results 114 (See FIG. 1). If so, the processor 204 executes the math function 212 to compute the result 108.

If not, the error module 306 signals 410 an error condition. The error condition may be communicated to the processor 204, and I/O module 206, a software module that initiated the math function call, or the like. Preferably, the error condition signaled 410 by the error module 306 prevents execution of the math function 212 before computing resources are wasted. Once an error condition is signaled or the processor 204 begins evaluating the math function 212, the method 400 ends 412.

Figure 5:
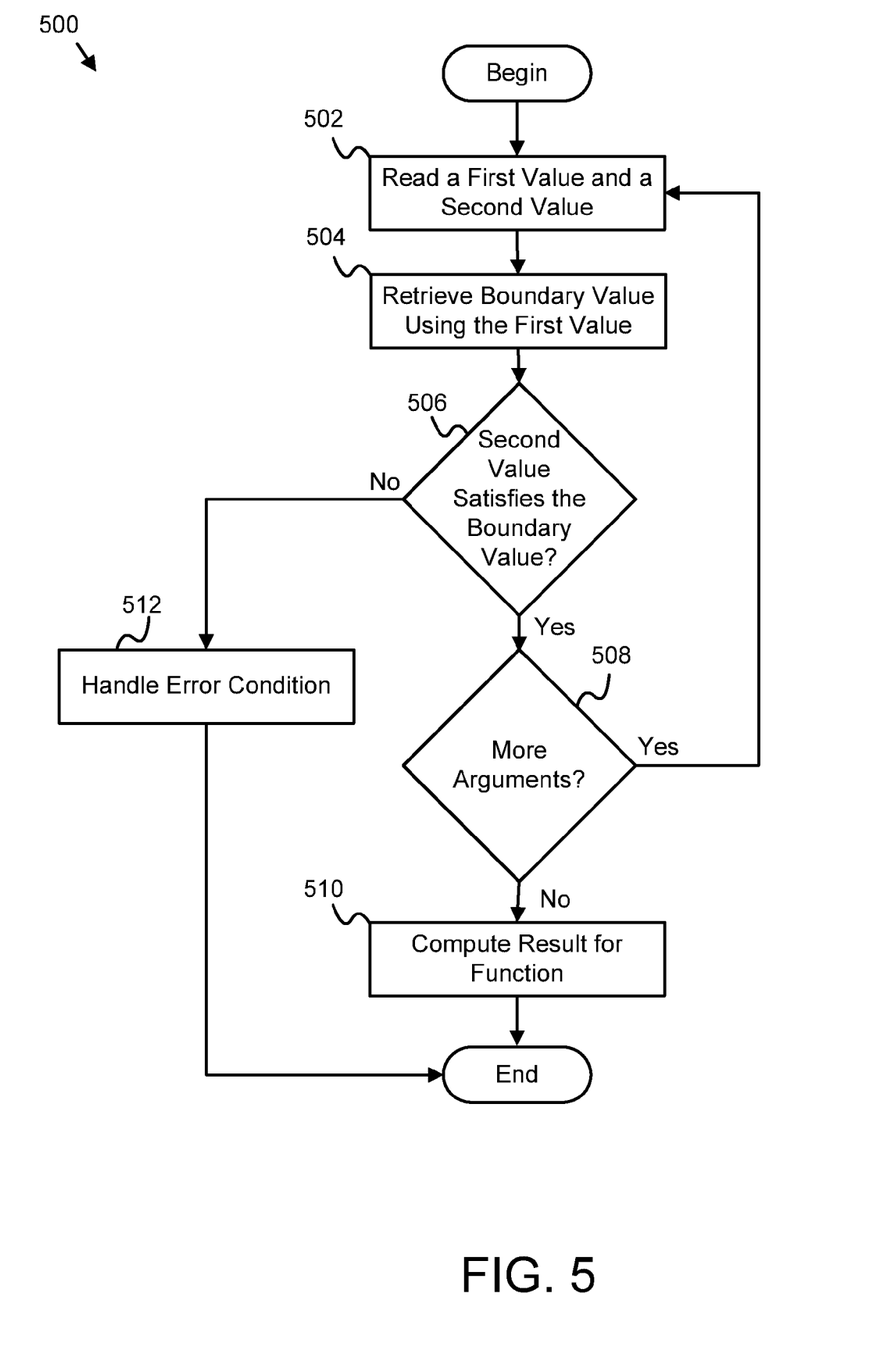
FIG. 5 is a schematic flow chart diagram illustrating more detail of one embodiment of a method for efficient and reliable computation of results for mathematical functions.

FIG. 5 illustrates a schematic flow chart diagram illustrating one embodiment of a method 500 for determining whether function argument values that interrelate to define the range of computable results 114 will produce a result 110, 112 outside the range of computable results 114. Initially, a read module 308 reads 502 a first value associated with a first argument for the math function and a second value associated with a second argument. Preferably, the first value and second value are read from a storage location in memory 202. Alternatively, the first value and second value are fetched from a buffer or other data structure temporarily storing the values associated with the function arguments.

In one embodiment, the control module 304 is configured to conduct special checks for certain argument values that produce well-known and well-defined results. Certain arguments may produce a particular result regardless of the values for the other arguments or may lead to a well-known undefined result for the function. Consequently, the control module 304 may perform these special tests prior to continuing the method 500.

For example, suppose the function is x^y. The x value is 0 and the y value is 0. The result is mathematically undefined. The control module may test the x and y values for 0. If x and y are 0, the control module 304 may cause the error module to signal the error condition, without performing any more of the steps of method 500 described below.

In certain embodiments, where a function has more than two arguments the read module 308 may read all the arguments and store the corresponding values in temporary storage locations in memory 202. In another embodiment, for functions that accept one or more complex numbers, the read module 308 may divide a complex number value into its real part and imaginary part. Each part may then be stored in particular temporary storage locations. Of course a math function may comprise arguments having a homogeneous or heterogeneous set of numeric types including integer, floating point, and complex.

Next, a lookup module 310 retrieves 504 at least one boundary value. Preferably, the boundary value is located using the first value as an identifier, a key or index into a set of boundary values 210. In certain embodiments, the first value is used directly for the index. In other embodiments, the first value is used as a basis for computing the index. For example, suppose the indexes are whole numbers. If the first value is a decimal or non-integer number, the first value may be rounded according to various rounding techniques to produce a whole number corresponding to the proper index.

Preferably, the set of boundary values 210 are organized in a table with the boundary values serving as columns and the rows corresponding to values within the domain of the first argument. The rows indexed by the values of the first argument contain boundary values that will allow evaluation of a computable result 108. Consequently, if the lookup module 310 fails to find a row in the table corresponding to the index derived from the first value, the first value may be considered a value that will produce a result for the function outside the range of computable results 114. Accordingly, execution of the function call is aborted.

Next, the comparison module 312 determines 506 whether second value satisfies the boundary value. Satisfaction of the boundary value means the second value and the first value together will produce a result for the function within the range of computable results 114.

If the boundary value is satisfied, the control module 304 may determine 508 whether the function includes more than two arguments. If so, the method 500 returns to step 502 where a value for the next argument is read. In certain embodiments, a boundary value is retrieved 504 for the value of the next argument using the first value. Alternatively, a row of the table may include a plurality of boundary values that each correspond to a different argument such that the row can be retrieved 504 just once. Alternatively, a row of the table may include an index or pointer to another row of the table depending on the values of previously validated arguments.

If no more function arguments exist, the processor 204 computes 510 the result for the function. If a second or subsequent value fails to satisfy its corresponding boundary value(s), the error module 306 signals 512 an error condition as described above in relation to FIG. 3.

Figure 6:
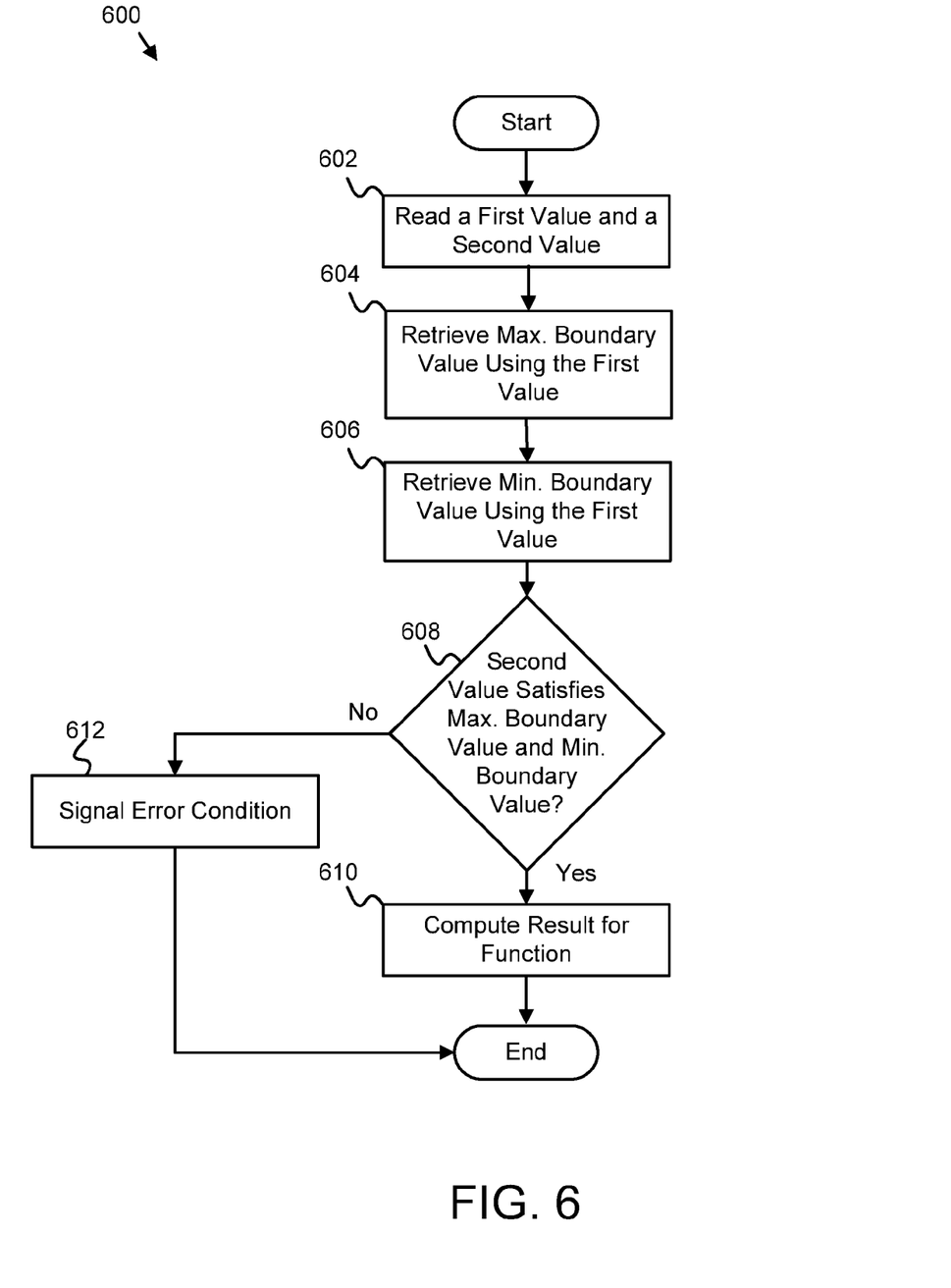
FIG. 6 is a schematic flow chart diagram illustrating one embodiment of a method for efficient and reliable computation of results for mathematical functions.

FIG. 6 illustrates a schematic flow chart diagram illustrating one embodiment of a method 600 for determining whether function argument values that interrelate to define the range of computable results 114 will produce a result 110, 112 outside the range of computable results 114. The method 600 is very similar to the method 500 described above. However, depending on the function and the type of argument values being used, each function argument value may have an upper bound and a lower bound that affects the range of computable results.

As in method 500, a read module 308 reads 602 a first value and a second value. Also as in method 500, a lookup module 310 retrieves 604 one boundary value. This boundary value may comprise a maximum boundary value. Next, the lookup module 310 may retrieve 606 a minimum boundary value again using the first value. Preferably, the maximum boundary value and minimum boundary value are both stored in the same repository 314 of boundary values 210. In addition, the maximum boundary value and minimum boundary value are both referenced using the first value either as a direct index or to derive an index into the repository 314. As with the maximum boundary value, the minimum boundary value is defined for the function over a domain of the first argument.

The maximum boundary value defines an upper bound. If the second value is greater than this upper bound the math function result will be outside the range of computable results. The minimum boundary value defines an lower bound. If the second value is less than this lower bound the function result is also outside the range of computable results.

Accordingly, the comparison module 312 determines 608 determines whether second value satisfies the maximum boundary value and the minimum boundary value. If the second value is between the maximum boundary value and the minimum boundary value, the math function result will be inside the range of computable results.

As described in more detail in relation to FIG. 5, if the math function result will be inside the range of computable results, the function result is similarly computed 610. If not, an error condition is similarly signaled 612.

Figure 7A:
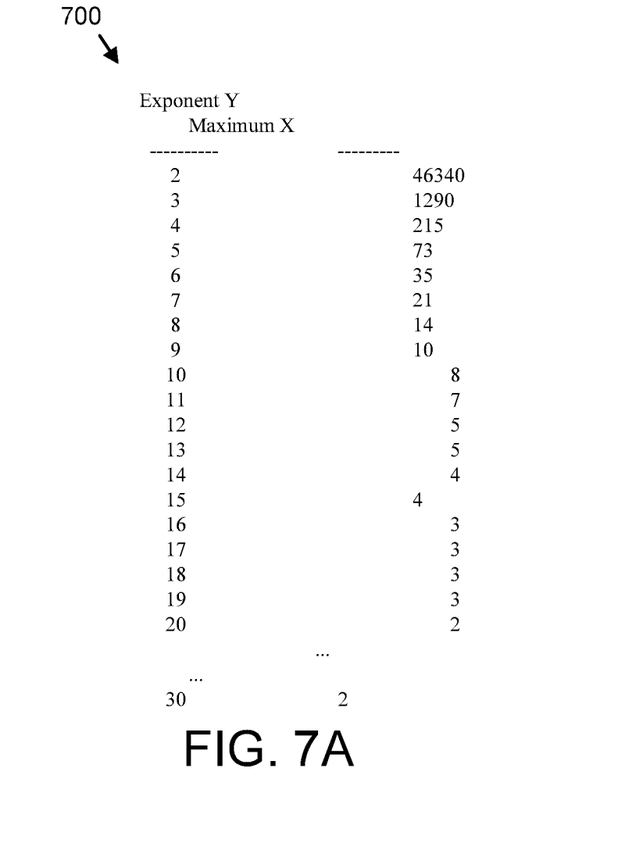
FIG. 7A is a table diagram illustrating an example of a data structure for a repository of boundary values.
Figure 7B:
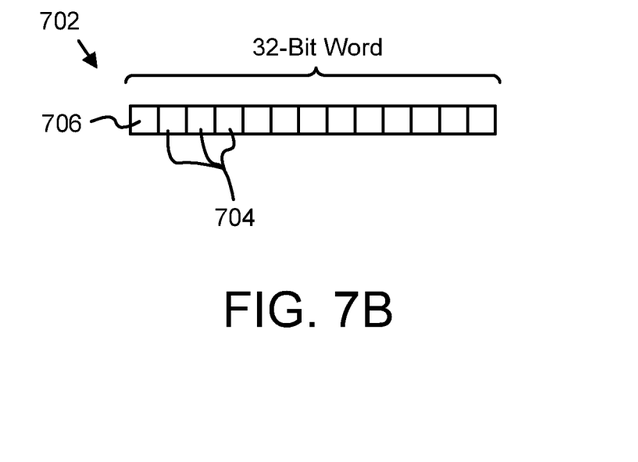
FIG. 7B is a schematic block diagram illustrating one example of a data structure suitable for use in efficient and reliable computation of results for mathematical functions.
Figure 7C:
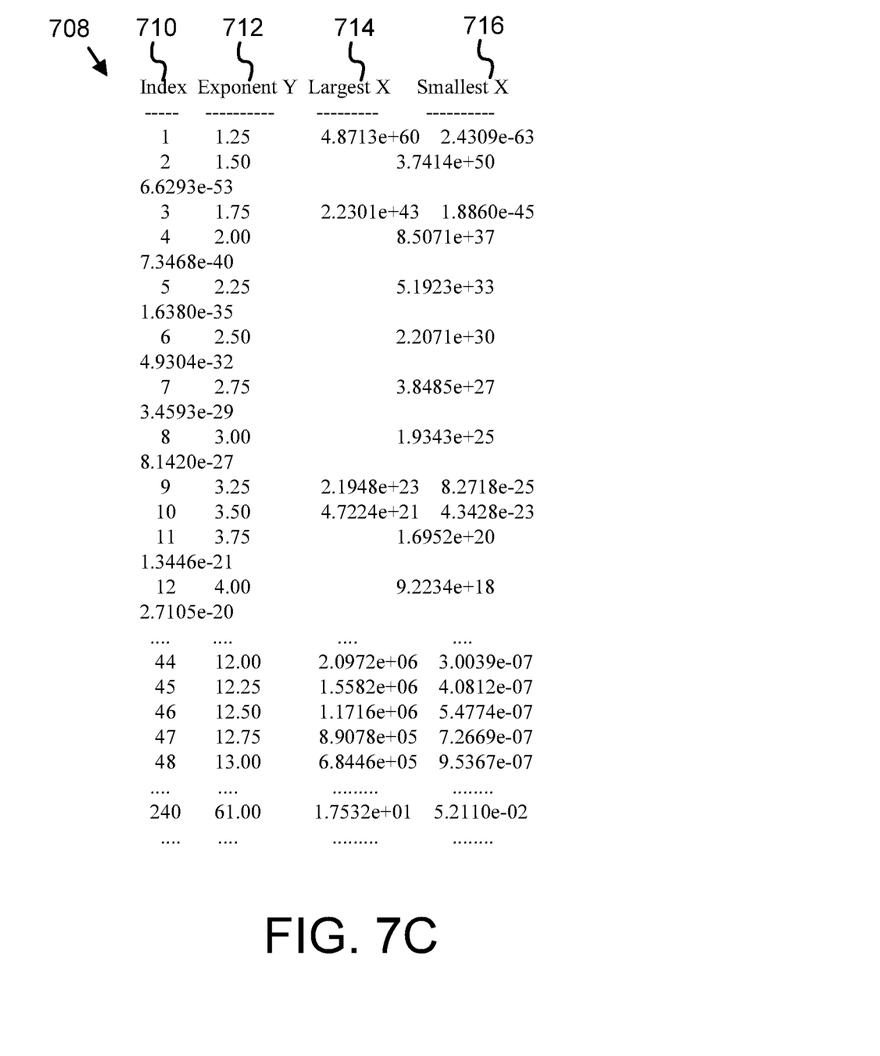
FIG. 7C is a table diagram illustrating an example of a data structure for a repository of boundary values according to another embodiment.

FIG. 7A illustrates a representative example of a table 700 illustrating one embodiment of a repository 314 of boundary values 210. In view of the description provided above, those of skill in the art will readily recognize that efficiencies for speed, reliability, and storage space can be made depending on the design of the repository 314, the function involved, and the numeric representation used for the argument values and function result. FIGS. 7A-7C illustrate where a few of the many tradeoffs may be made to optimize certain embodiments for a particular use or need.

For example in FIG. 7A, suppose the function is the power function, $f(x,y)=x^y$. Further suppose, that x and y are integers represented in a processing system by 32-bit binary values. In addition, the power function may be configured to perform validity tests on the argument for special values such as x or y equal to zero. Other special cases for which the result is limited by the use of integers include $x=\pm 1$, y being a negative value, and the like. As mentioned above, the power function itself may be programmed to test and respond to these special cases. Positive values for $y>1$ and $x \neq 1, 0,$ or $-1$ incur such an overhead that function range test module 208 may be used to optimally determine whether the result is computable prior to attempting to compute the result.

Consequently, the repository 314 of boundary values 210 for this example may be organized as set forth in table 700.

The table 700 includes two columns, one for y values, and one for maximum x values. Preferably, the number of columns corresponds to the number of arguments for the function. Those of skill in the art will recognize that use of y values and maximum x values is an implementation design decision. A similar table may be used in which one column is x values and the other column is maximum y values. Similarly, whether maximum values or minimum values are used depends on the type of function and the representation for the arguments and result.

The table 700 is preferably predefined such that the data values of the table 700 may be readily stored in high-speed and compact memory 202 (See FIG. 2) such as a cache. Values in the "Exponent y" column may comprise a sequential listing of y values other than the special cases discussed above. In FIG. 7A, the y values begin at 2 and end at 30.

As discussed above, one of the function arguments may be used as an index into the table 700. In addition, the table may comprise a finite number of entries. In certain embodiments, depending on the function, values of y not found within the y column may be known to produce incomputable results regardless of the value of x. Consequently, if a given y value is not within the table 700, the function range test module 208 may report an error condition.

The maximum x values are predefined using an inverse of the function and the value y of the row. In this example, because the result is stored in a memory data structure of a 32-bit binary value, the upper limit on representable numbers for the processing system is known. In this example, presuming 31 bits of binary data and a single sign bit, the maximum value the 32-bit result can hold is 2,147,483,647. Each maximum x value is determined by taking the y-th root of the maximum number that the 32-bit result can hold, 2,147,483,647, and truncating any fractional part of the square root to obtain the required maximum x value.

The table 700 illustrates that as y increases the maximum value for x rapidly decreases. If y is greater than 30 and x is any positive value besides 1, the result is greater than the value the 32-bit result can hold. The value is outside the range of computable results 114. An overflow condition would occur. Similarly, if y is 18 and x is a value greater than 3 an overflow condition would occur.

By quickly looking a y value up in the table 700, the function range test module 208 rapidly determines whether the x value is within the boundary value, maximum x. If not, evaluation of the function is aborted before computing resources are wasted. In addition, the function range test module 208 operates very rapidly such that the delay in evaluating a function having valid arguments is minimized.

The table 700 also illustrates how the size and numeric representation for the arguments and result can affect the range of computable results 114. The maximum x values defined depend in part on the fact that the function and/or processing system is designed to handle strictly integers. Those of skill in the art will recognize that the table 700 may be revised for functions that accept all floating point arguments and produce a floating point result or that handle a mixture of floating point and integers values.

FIG. 7B illustrates a representative example of a data structure used to organize a memory location used to store atomic values used in the evaluation of the mathematical function. Typically, as in the example above, the hardware and software of the processing system are designed to represent numbers using a certain size data structure, a memory location. The memory location may comprise RAM, cache, or a register. The size may be determined by the size of internal communication buses and internal communication protocols. Most processing systems represent numbers using a standard size 32-bit word 702. Data within the word 702 be represented differently depending on the numeric representation used by the processing system.

Typically, in a signed magnitude representation, the word 702 comprises 31 data bits 704 and one sign bit 706. Alternatively, in a two's-complement representation, a sign bit is still used but negative values are represented by the one's complement of the data bits 704 plus one. In yet another alternative, data in the word 702 may be represented using the offset binary representation. Those of skill in the art will readily recognize that the type of representation used by a processing system to represent the atomic values used in the math function affects the range of the computable results. If the one representation allows for a larger value to be stored and represented, the range of computable results 114 is similarly affected. The converse is also true. Consequently, different manners for representing the values may affect what values are included in the repository 314 and/or whether addition special tests are included for special values of arguments.

Furthermore, if the processing system executing the function uses larger words 702, the maximum and minimum representable values also increase. For example the word 702 may comprise sixty-four bits. Alternatively, in certain processing systems the word may comprise sixteen bits. Consequently, the size of the word 702 used to represent atomic values (single independently represented values) affects the scope of the range of computable results 114.

FIG. 7C illustrates a representative example of a table 708 illustrating one embodiment of a repository 314 of boundary values 210 in which the result and arguments are real numbers. The table 708 includes an index column 710, a y column 712, a maximum x column 714, and a minimum x column 716. In this example, the maximum x column 714 and minimum x column 716 represent respectively a maximum boundary value and a minimum boundary value. The index values 710 are derived by subtracting a suitable base value (in this example, 1.00) from the y argument and multiplying the result by the inverse (in this example, 4) of the desired granularity (in this example, 0.25). This technique provides efficient access to the desired boundary values.

One embodiment operates using the table 708 as described above. If a floating point x value falls within the values for the maximum x column 714 and minimum x column 716 for a given y value, the function will produce a result within the range of computable results 114. In this example, again suppose the function is the power function $f(x,y)=x^y$ and that x, y, and the result can be floating point or non-integer values. Because floating point values can be very small, an almost infinite number of possible values exist for the value of y. Consequently, the number of rows in the table 708 could be very large. Consequently, depending on the expected frequency that certain values of y will be provided as arguments and the type of function, the number of entries or rows in the table 708 may be set to a finite number. In this manner, the size of the table 708 can be kept minimal such that the benefits of using the table are not outweighed by space or retrieval delay requirements.

To reference the table 708, the lookup module 310 preferably uses an index or key using techniques similar to those described above. Typically, the argument value is used directly or as a basis to derive the index. Consequently, how consecutive values for the argument value are selected for entries in the table 708 affects the granularity for testing certain values of the argument value.

In table 708, suppose that rows for successive y values are used in increments of one-fourth (0.25). Further suppose that the function accepts any floating point value for the y value. The y values supplied to the function are not limited to values that exactly match the selected increments of y values 712 in the table 708. In certain embodiments employing the table 708, a fast, simple rounding function such as the one described above may be applied to the y value to derive the index. In this manner, various floating point values of y can be tested and the ranges for the maximum x 714 and minimum x 716 more accurately define the range of computable results 114.

Figure 8:
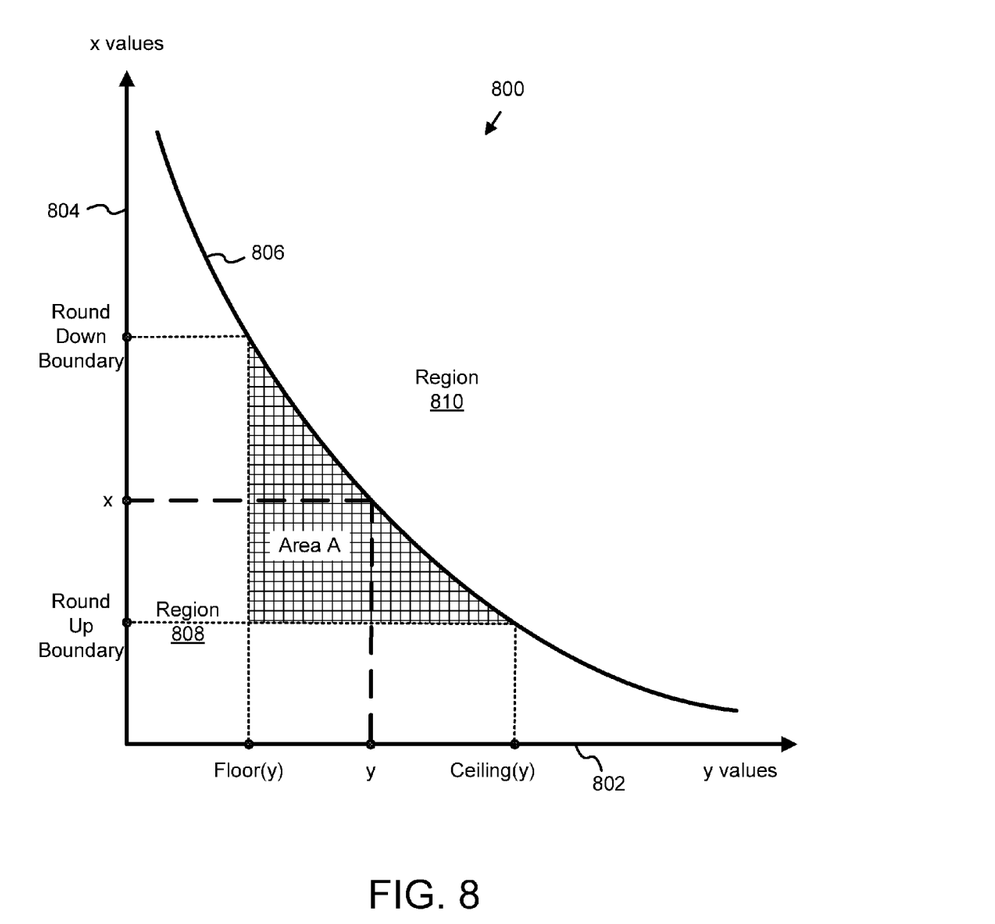
FIG. 8 is a graph diagram illustrating how variation in values of arguments for multi-argument functions affect the range of computable results.

FIG. 8 illustrates a graph 800 indicating the relationship of a first argument to a second argument in defining the range of computable results 114 for a given function f(x,y). The graph 800 includes a y-axis 802 that represents values of y and an x-axis 804 that represents values of x. The curve 806 illustrates the boundary between a region 808 of computable results and a region 810 of non-computable results for a generic function f(x,y).

The boundary values 210 stored in the repository 314 facilitate identifying whether a result will fall above or below the curve 806 for a given first argument value. Those of skill in the art will recognize that depending on how y values are selected for entries in the repository 314, the curve may be more accurately approximated. Consequently, certain embodiments more accurately determine whether a computable result is possible. However, those of skill in the art will also recognize the tradeoff between closely approximating this curve 806 and the overhead required to store and reference a larger repository 314. As the curve is more closely approximated, the number of entries in the repository 314 increases.

If the indexed function argument has almost an infinite number of possible values, those implementing a certain embodiment can determine how the indexed function argument value is to be rounded, up or down, to derive an index for the desired boundary values. In FIG. 8, if the indexed function argument is y, rounding up may involve applying the ceiling of y, rounding down may comprise taking the floor of y. These ceiling and floor operations can create index values of any desired granularity, depending on the implementation tradeoffs described above. Those of skill in the art will recognize that the granularity of the index values will be determined in part by the behavior of the mathematical function in various argument ranges.

FIG. 8 illustrates certain tradeoffs in choosing to round up or round down. If rounding down to Floor(y) is selected, certain apparently valid values of x less than the "Round Down Boundary" value may be allowed to proceed to evaluation of the function even though there is a chance that the x value will cause the result to fall in region 810, above the curve. However, y and x values within the shaded Area A are also permitted for use in the function and valid computable results are computed.

Alternatively, if rounding up to Ceiling(y) is selected, certain values of x greater than the "Round Up Boundary" value are not allowed to proceed to evaluation of the function even though there is a chance that the y value will cause the result to fall within the shaded Area A, below the curve. Thus, some values of y and x that lead to valid computable results could be excluded as invalid. Those of skill in the art will readily recognize the benefits and costs of making these tradeoffs.

Advantageously, various embodiments of the present invention provide for efficient and reliable computation of results for mathematical functions. Certain embodiments accurately and quickly test a plurality of math function arguments to determine whether present argument values produce a result within the range of computable results. Certain embodiments impose minimal overhead in evaluating math functions and saves considerable computing resources that otherwise would be wasted evaluating a function for which the plurality of arguments would produce an incomputable result.

The embodiments of the present invention may be embodied in other specific forms without departing from its spirit or essential characteristics. The described embodiments are to be considered in all respects only as illustrative and not restrictive. The scope of different embodiments of the invention is, therefore, indicated by the appended claims rather than by the foregoing description. All changes which come within the meaning and range of equivalency of the claims are to be embraced within their scope.

What is claimed is:

1. A method for efficient computation of results for mathematical functions, the method comprising:
receiving, by user of a processor, a mathematical function call, the call comprising a plurality of arguments for which a range of computable results for the mathematical function of the function call varies with respect to the values for the arguments;
determining whether executing the mathematical function using the plurality of arguments will produce a result within the range of computable results; and
aborting the mathematical function call prior to initiating execution of the mathematical function in response to determining that the values for the plurality of arguments produce a result outside the range of computable results.

2. The method of claim 1, wherein the plurality of arguments comprise a first argument value and a second argument value and the range of computable results defines at least one boundary value for the second argument value, the boundary value varying as the first argument value varies.

3. The method of claim 1, further comprising,
reading a first value associated with a first argument of the mathematical function and a second value associated with a second argument;
retrieving a boundary value from a repository of predefined boundary values defined for the mathematical function over a domain of the first argument, the boundary value retrieved using the first value;
determining whether the second value satisfies the boundary value.

4. The method of claim 3, wherein the repository is a table and the first value comprises an index into the table of boundary values.

5. The method of claim 3, wherein the boundary value comprises a maximum boundary value and the repository of boundary values comprises the maximum boundary value and a minimum boundary value, wherein the method retrieves the minimum boundary value from the repository of boundary values defined for the mathematical function over a domain of the first argument, the minimum boundary value retrieved using the first value and the method determines whether the second value satisfies the maximum boundary value and the minimum boundary value.

6. The method of claim 3, wherein the repository of predefined boundary values comprises a finite number of entries for a first argument having an infinite number of possible values, the finite number selected to minimize the size of the repository of predefined boundary values in relation to anticipated values for the first value.

7. The method of claim 1, wherein the range of computable results is defined based on the size of a memory location that stores atomic values during evaluation of the mathematical function.

8. The method of claim 1, wherein the range of computable results is defined based on a numeric representation used to store atomic values used to evaluate the mathematical function.

9. The method of claim 1, wherein the range of computable results is defined according to a numeric type defined for one or more of the plurality of arguments, the numeric type selected from the group consisting of an integer type, a non-integer type, and a floating point type.

10. The method of claim 1, further comprising signaling an error condition in response to determining that the plurality of arguments produce a result outside the range of computable results.

11. A method for efficient computation of results for mathematical functions, the method comprising:
receiving, by use of a processor, a mathematical function call, the call comprising a plurality of arguments for which a range of computable results for the mathematical function of the function call varies with respect to the values for the arguments;
determining whether executing the mathematical function using the plurality of arguments will produce a result within the range of computable results;
aborting the mathematical function call prior to initiating execution of the mathematical function in response to determining that the values for the plurality of arguments produce a result outside the range of computable results;
wherein the plurality of arguments comprise a first argument value and a second argument value and the range of computable results defines at least one boundary value for the second argument value, the boundary value varying as the first argument value varies; and
reading a first value associated with a first argument of the mathematical function and a second value associated with a second argument;
retrieving a boundary value from a repository of predefined boundary values defined for the mathematical function over a domain of the first argument, the boundary value retrieved using the first value; and
determining whether the second value satisfies the boundary value.

12. The method of claim 11, wherein the repository is a table and the first value comprises an index into the table of boundary values.

13. The method of claim 11, wherein the boundary value comprises a maximum boundary value and the repository of boundary values comprises the maximum boundary value and a minimum boundary value, wherein the method retrieves the minimum boundary value from the repository of boundary values defined for the mathematical function over a domain of the first argument, the minimum boundary value retrieved using the first value and the method determines whether the second value satisfies the maximum boundary value and the minimum boundary value.

14. The method of claim 11, wherein the repository of predefined boundary values comprises a finite number of entries for a first argument having an infinite number of possible values, the finite number selected to minimize the size of the repository of predefined boundary values in relation to anticipated values for the first value.

15. The method of claim 11, wherein the range of computable results is defined based on the size of a memory location that stores atomic values during evaluation of the mathematical function.

16. The method of claim 11, wherein the range of computable results is defined based on a numeric representation used to store atomic values used to evaluate the mathematical function.

17. The method of claim 11, wherein the range of computable results is defined according to a numeric type defined for one or more of the plurality of arguments, the numeric type selected from the group consisting of an integer type, a non-integer type, and a floating point type.

18. The method of claim 11, further comprising signaling an error condition in response to determining that the plurality of arguments produce a result outside the range of computable results.

* * * * *